United States Patent
Pope et al.

(10) Patent No.: US 6,639,599 B2
(45) Date of Patent: Oct. 28, 2003

(54) METHOD AND SYSTEM FOR DYNAMICALLY GENERATING VIEW DEPENDENT RENDERING ELEMENTS FROM A STATIC ADAPTIVELY SAMPLED DISTANCE FIELD

(75) Inventors: Jackson W. J. Pope, Westbury Park (GB); Sarah F. Frisken, Cambridge, MA (US); Ronald N. Perry, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 355 days.

(21) Appl. No.: 09/833,886

(22) Filed: Apr. 12, 2001

(65) Prior Publication Data
US 2002/0149582 A1 Oct. 17, 2002

(51) Int. Cl.⁷ .............................................. G06T 17/00
(52) U.S. Cl. ..................................................... 345/428
(58) Field of Search ................................. 345/419, 420, 345/421, 422, 423, 424, 426, 427, 428, 619, 631, 473

(56) References Cited

U.S. PATENT DOCUMENTS

| 6,300,956 B1 | * | 10/2001 | Apodaca et al. | 345/619 |
| 6,300,960 B1 | * | 10/2001 | DeRose et al. | 345/474 |
| 6,396,492 B1 | * | 5/2002 | Frisken et al. | 345/420 |
| 6,483,518 B1 | * | 11/2002 | Perry et al. | 345/590 |

OTHER PUBLICATIONS

Frisken et al., "Adaptively Sampled Distance Fields: A General Representation of Shape for Computer Graphics", Proceedings for SIGGRAPH 2000, pp. 249–254, 2000.

Michael Garland, "Multiresolution Modeling: Survey & Future Opportunities"; Eurographics '99, State of the Art Reports, pp. 111–131, 1999.

Hugues Hoppe, "View–Dependent Refinement of Progressive Meshes"; Proceedings of SIGGRAPH 1997, pp. 189–198, 1997.

Luebke et al., "View–Dependent Simplification of Arbitrary Polygonal Environments"; Proceedings of SIGGRAPH 1997, pp. 199–208, 1997.

* cited by examiner

*Primary Examiner*—Mark Zimmerman
*Assistant Examiner*—Enrique L Santiago
(74) *Attorney, Agent, or Firm*—Dirk Brinkman

(57) ABSTRACT

A method dynamically generates rendering elements for a graphics model. The model is first converted to an adaptively sampled distance field including surface cells representing a surface of the model. A visibility element is determined for each surface cell. A set of active cells is determined, where each active cell is associated with one of the surface cells of the adaptively sample distance field, and each active cell has a corresponding visibility element. Rendering elements are determined for each active cell. Active cells are added and deleted from the set of active cells dynamically according to a weight determined for each active cell by a weighting function. The weight of each active cell can depend on viewing and shading parameters. Rendering elements are dynamically generated when active cells are added to the set of active cells and dynamically deleted when active cells are deleted from the set of active cells.

15 Claims, 5 Drawing Sheets

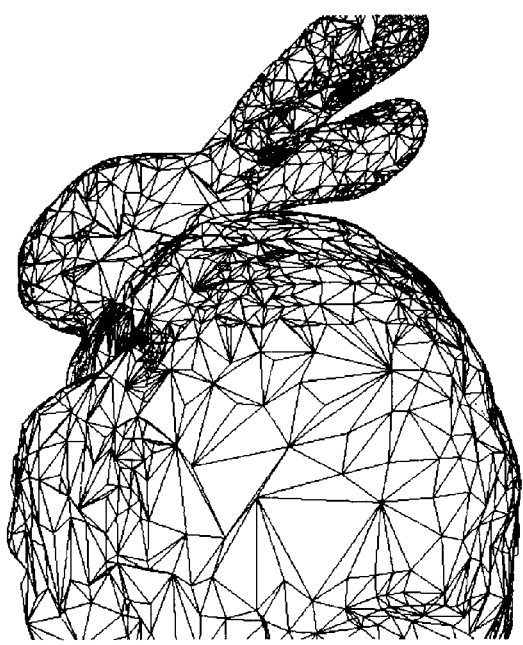 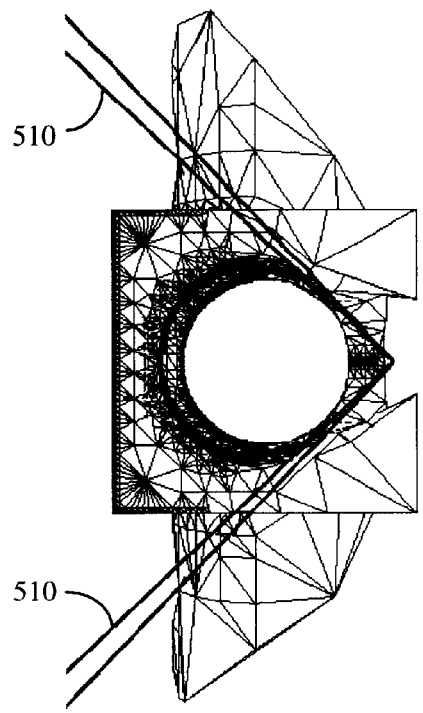
*Fig. 5a*  *Fig. 5b*

METHOD AND SYSTEM FOR DYNAMICALLY GENERATING VIEW DEPENDENT RENDERING ELEMENTS FROM A STATIC ADAPTIVELY SAMPLED DISTANCE FIELD

FIELD OF THE INVENTION

The present invention relates generally to the field of computer graphics, and more particularly to generating rendering elements while dynamically varying viewing parameters and frame rate requirements.

BACKGROUND OF THE INVENTION

In real-time graphics applications, such as games and physical simulations, numerous techniques are known to automatically generate models in the form of polygon meshes. Common generation techniques include laser range scanning and triangulation of implicit functions. Often, the resultant meshes include more polygons that can be rendered by standard rendering engines at real-time frame rates.

Therefore, in order to reduce the number of polygons in the models, multiresolution triangle meshes are frequently used. These methods typically use two approaches for generating level-of-detail (LOD) meshes. In the static approach, a set of static LOD meshes are pre-computed before use in an application. At run-time, a member of the set is selected, based on viewing parameters and frame rate requirements, and displayed. In the dynamic approach, a single dynamic mesh is generated before use in the application, and then the mesh is adapted by a series of transformations according to the viewing parameters and the frame rate requirements, see Garland "*Multiresolution Modeling: Survey and Future Opportunities,*" Eurographics '99 State of the Art Reports, pp. 111–131, 1999.

Known dynamic meshing methods, such as view dependent progressive meshes (VDPM), and hierarchical dynamic simplification (HDS), generate hierarchical data structures that can be refined and decimated to reduce the number of polygons in the meshes. The hierarchy in the VDPM is formed by generating a new parent vertex for every pair of vertices combined by an edge collapse operation, see Hoppe "*View-Dependent Refinement of Progressive Meshes,*" Proceedings of SIGGRAPH 1997, pp. 189–198, 1997. The HDS hierarchy is formed by spatially subdividing a scene into cells, and grouping vertices in each cell into a single representative vertex, see Luebke et al. "*View-Dependent Simplification of Arbitrary Polygonal Environments,*" Proceedings of SIGGRAPH 1997, pp. 199–208, 1997. In both methods, a screen space error and normal cones are used to determine when to refine and decimate the mesh.

However, these techniques can still produce more polygons than needed. Furthermore, their processing time is dependent on the number of polygons in the original model, which can be prohibitively slow for large models. Finally, these methods can produce poor quality models when the polygon count is small.

Therefore, there is a need to provide a method and system for automatically generating real-time dynamic meshes that match viewing parameters and desired frame rates.

The use of normal cones for determining visibility is known in the art, see Hoppe and Luebke et al. as described above. In both systems, normal cones are constructed from the initial geometry of the model and placed in a data structure such as an octree. There, the range, or spread, of normals in an octree cell is a function of where the geometry lies with respect to the octree grid. For example, a leaf cell of the octree can have a large spread of normals simply because the geometry within that cell has a large degree of curvature. This type of normal cone construction can cause a rendering engine to draw many more polygons than necessary because polygons that should be classified as invisible, e.g., back-facing, are instead classified as visible since the polygons are grouped in a leaf cell with a large spread of normals indicating, erroneously, that they are visible.

Therefore, there is a need to provide a method for automatically generating detail directed visibility elements, e.g., detailed directed normal cones, that will more accurately classify geometry such as polygons according to visibility, thus avoiding unnecessary processing such as the rendering of polygons as described above.

SUMMARY OF THE INVENTION

It is an object of the present invention to enable the real-time generation of viewpoint-dependent dynamic rendering elements, such as triangles and points, from adaptively sampled distance fields.

It is another object of the present invention to produce rendering elements that are of high visual quality, and a low quantity of rendering elements in invisible areas.

The present invention provides a method for dynamically generating rendering elements for a graphics model. The model is first converted to an adaptively sampled distance field including surface cells representing a surface of the model. A visibility element is determined for each surface cell. A set of active cells is determined, where each active cell is associated with one of the surface cells of the adaptively sample distance field, and each active cell has a corresponding visibility element. Rendering elements are determined for each active cell.

Active cells are added and deleted dynamically from the set of active cells according to a weight determined for each active cell by a weighting function. The weight of each active cell can depend on viewing and shading parameters. Rendering elements are dynamically generated when active cells are added to the set of active cells and dynamically deleted when active cells are deleted from the set of active cells.

BRIEF DESCRIPTION OF THE DRAWINGS

FIG. 5*a* is a dynamic model with 16984 triangles at 47 frames per second; and FIG. 5*b* is a dynamic model with 23364 triangles at 41 frames per second.

DETAILED DESCRIPTION OF THE PREFERRED EMBODIMENT

Introduction

Figure 1:
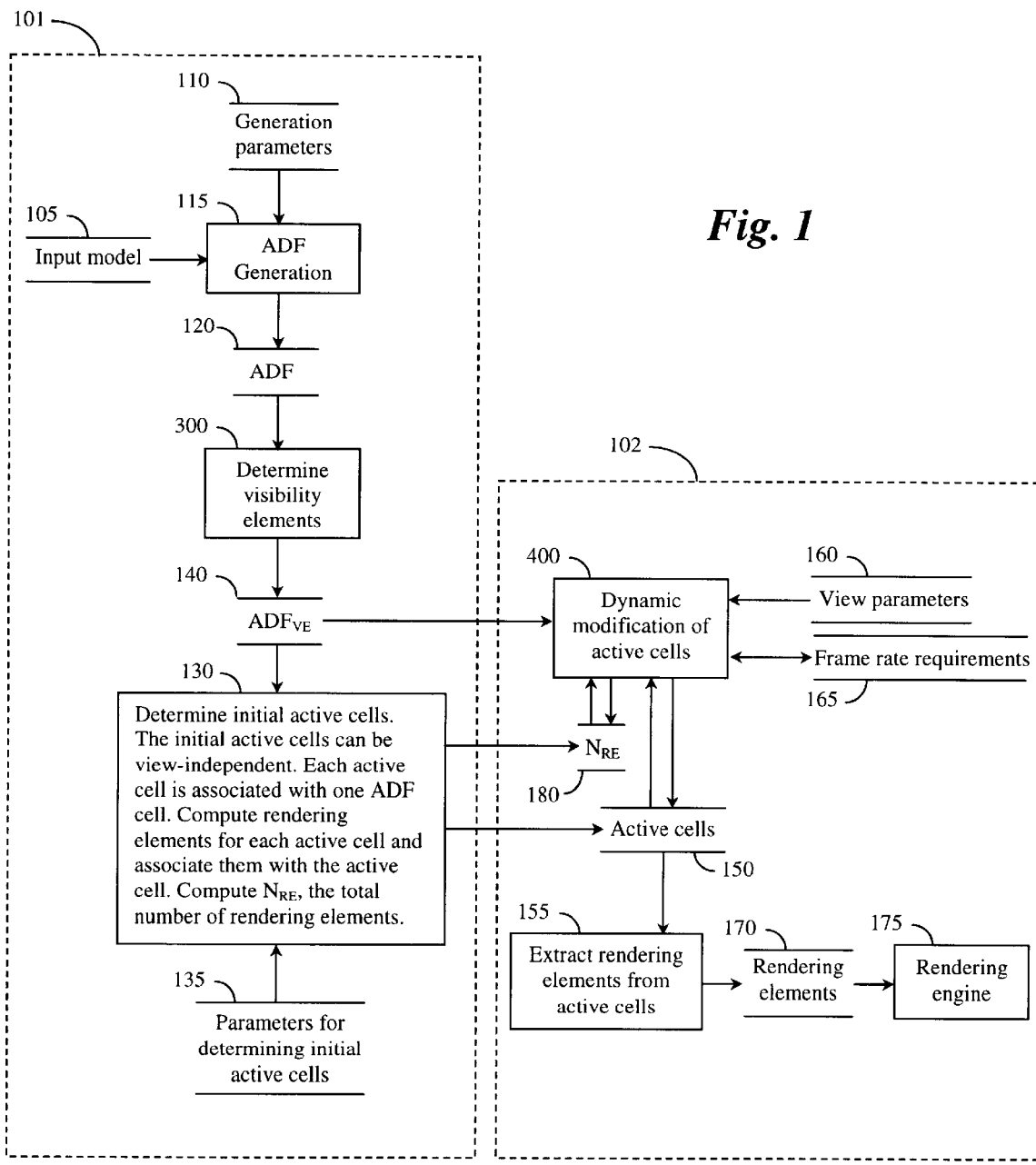
FIG. 1 is a flow diagram of a method for generating view dependent dynamic rendering elements according to the invention.
Figure 2A:
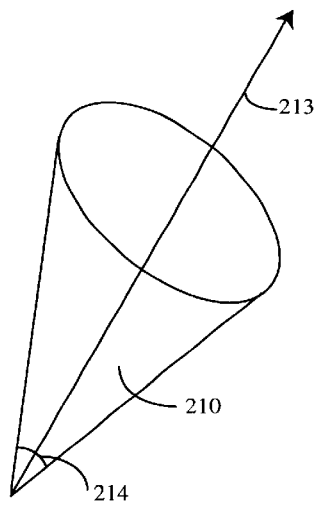
FIGS. 2*a*, 2*b*, 2*c*, and 2*d* show examples of visibility elements.
Figure 2B:
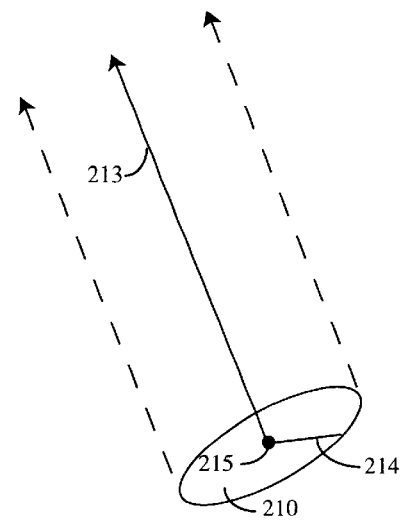
Figure 2C:
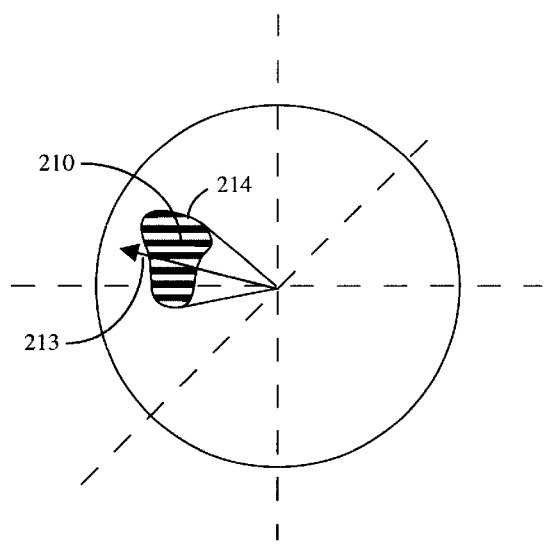
Figure 2D:
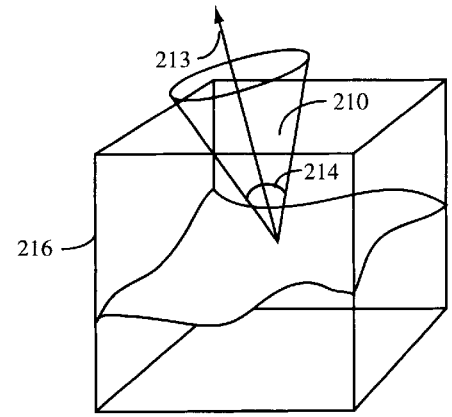

FIG. 1 shows a computerized dynamic modeling system and method 100 according to our invention. The modeling system and method 100, as a basis, uses an adaptively sampled distance field (ADF) 120 to represent a digitized model that can be animated, in real-time, for use by the entertainment industry and physical simulations.

The basic data structure of an ADF is described in U.S. patent application Ser. No. 09/370,091 "*Detail-Directed Distance Fields*" filed by Frisken et al. on Aug. 6, 1999, incorporated herein in its entirety by reference.

The ADF 120 can be generated from an input model 105 by a ADF generation method 115 according to generation parameters 110. For example, the generation parameters can specify a level-of-detail, or acceptable error measures. The method 115 adaptively samples distance values in a signed distance field of the model 105, and stores the distance values in a spatial hierarchy of cells, for example a sparse octree of cells. Distance values with a positive sign are exterior to the object, negative distance values are interior, and zero distance values represent the surface of the object.

Methods that can operate on ADFs are described in: U.S. patent application Ser. No. 09/810,983 "*System and Method for Generating Adaptively Sampled Distance Fields with Bounded Distance Trees*" filed by Perry et al. on Mar. 16, 2001, U.S. patent application Ser. No. 09/810,839 "*Conversion of Adaptively Sampled Distance Fields to Triangles*" filed by Frisken et al. on Mar. 16, 2001, U.S. patent application Ser. No. 09/811,010 "*System and Method for Modeling Graphics Objects*" filed by Perry et. al. on Mar. 16, 2001, and U.S. patent application Ser. No. 09/809,682 "*System and Method for Converting Range Data to 3D Models,*" filed by Frisken et al. on Mar. 16, 2001.

Overview of System and Method

Our method and system 100 begins with the input model 105 constructed using any known modeling technique. For example, the model 105 can be in the form of range images, a point cloud, a triangle mesh, or an implicit function. Because the model 105 can be in many forms, our method is particularly suited for animation and physical modeling where many different model forms are often used in conjunction depending on production and time requirements, cost, and available technologies.

Our method comprises two stages: a pre-processing static stage 101, and a real-time dynamic stage 102. The static stage 101 generates 115 the ADF 120 from the model 105, and determines 300 visibility elements (VE) 210, see FIG. 2, for the ADF 120 to produce a single static $ADF_{VE}$ 140. The static stage also initializes 130 active cells 150 and a count of the total number of rendering elements $N_{RE}$ 180 required for the dynamic stage 102.

The dynamic stage 102 adapts and optimizes the active cells 150 and the $N_{RE}$ 180, which can be initially view-independent, for dynamically varying view parameters 160 and frame rate requirements 165. The dynamic stage is performed every frame, or every few frames, as required. During each adaptation of the active cells 150 and the $N_{RE}$ 180, the $ADF_{VE}$ 140 is considered to determine when active cells 150 need to be added or removed.

Processing Details

FIGS. 2*a*–*d* show example visibility elements, for example, a visibility cone, disk, and patch, and a cone positioned on a surface in 3D space. As described in further detail below, a detail directed visibility element (VE) 210 is determined 300 for each surface cell in the ADF 120, producing an annotated $ADF_{VE}$ 140.

The visibility element 210 minimally includes an axis 213 and a means 214, such as an angle, for defining the range, or spread, of normals of the surface associated with the visibility element. The visibility element 210 may also include a reference point 215, which anchors the visibility element in a coordinate system, and a data structure 216, such as a sphere, cube, and ADF cell, for describing the bounding volume of the surface associated with the visibility element 210.

The spread of normals 214 of the visibility element 210 essentially corresponds to the detail, e.g., the degree of curvature, of the portion of the surface associated with the visibility element 210.

The visibility element 210 associated with each surface cell in the ADF 120 indicates whether the associated surface cell could be potentially visible in a rendered image. The surface cell is potentially visible if any direction within the spread of normals 214 about the axis 213 of the visibility element 210 intersects an infinite sized image plane, i.e., the viewing plane. When a surface cell is visible, it is said to be "front-facing," otherwise it is "back-facing." Whether or not the surface cell is actually visible for a selected viewing frustum depends on specific viewing parameters 160.

A data structure 216 of the visibility element 210 can be used to determine whether the surface associated with the visibility element 210 is within the selected viewing frustum. If the data structure 216 indicates that the surface is outside of the selected viewing frustum, then the surface is invisible under the specific viewing parameters 160 of FIG. 1.

Because the visibility elements 210 associated with every surface cell of the $ADF_{VE}$ 140, they can be used to determine potential visibility of the surface cells for any viewing parameters 160. Therefore, the $ADF_{VE}$ 140 is said to be view independent and static.

Using parameters 135, the process 130 determines an initial set of active cells 150 that can be view independent. The parameters 135 can include the position and size of an initial view frustum. Each active cell of the set 150 corresponds to a selected one of the surface cells in the static $ADF_{VE}$ 140. The process 130 also determines initial rendering elements for each active cell of the set 150, and computes the initial total number of rendering elements $N_{RE}$ 180 for all the active cells of the set 150. Frisken et al. in "*Conversion of Adaptively Sampled Distance Fields to Triangles*", see above, describe a method for converting the active cells of the set 150 to triangular rendering elements.

A process 400 dynamically modifies the set of active cells 150 depending on the dynamic viewing parameters 160. The process 400 also minimizes the number of rendering elements $N_{RE}$ 180 that are produced in order to satisfy the frame rate requirements 165. In addition, the process 400 optimizes the visual quality of the images produced by using a higher level of detail in visually important regions, for example, the silhouette of a graphics object, or portions of the graphics object that are closer to the viewer.

A process 155 extracts the rendering elements 170 from the active cells 150. The rendering elements 170 can be in the form of points, non-uniform rational B-splines (NURBS), triangles, or other graphics primitives. A standard hardware or software rendering engine 175 can then further process the rendering elements to produce a sequence of image frames for various applications such as games, physical simulations, and movie production.

The dynamic process 400 increases the number of rendering elements $N_{RE}$ 180 when a particular active cell of the set 150 results in too few elements, and decreases the number of rendering elements $N_{RE}$ 180 when a particular active cell of the set 150 results in too many elements. Thus, the number of rendering elements $N_{RE}$ 180, at any one time, is kept at an optimal minimum that ensures quality images and meets desired frame rates. See below for the specific method steps which add and delete the rendering elements 170 associated with the active cells 150.

Detailed Directed Visibility Elements

Figure 3:
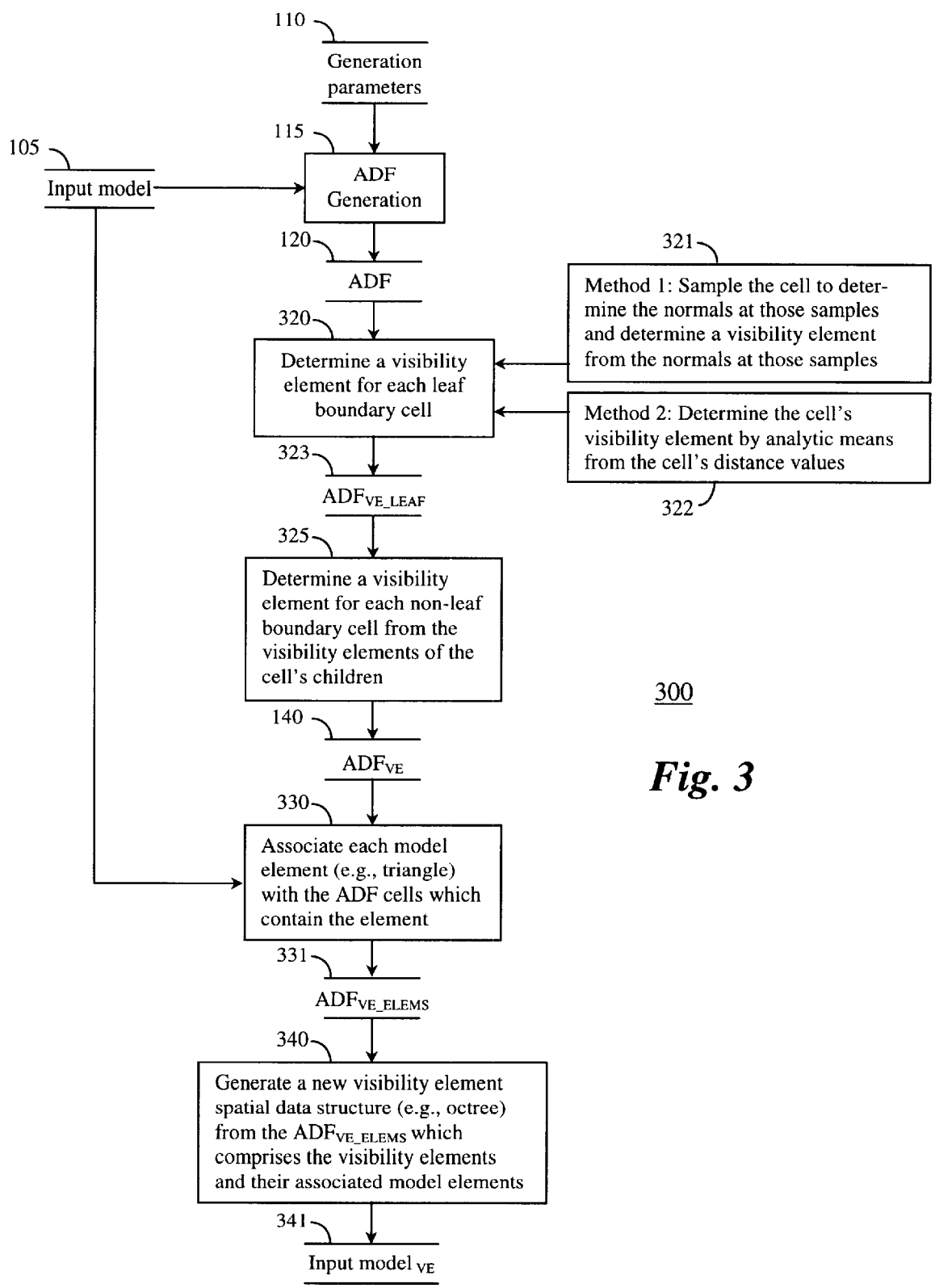
FIG. 3 is a flow diagram of a process for generating visibility elements used by the method of FIG. 1.

FIG. 3 shows the process 300 for determining visibility elements 210 in greater detail. In step 320, the distance values at a plurality of locations associated with, e.g., within and near, each leaf surface, i.e., boundary, cell of the ADF 120 are determined. That is, the root cell, intermediate cells, and interior and exterior cells are excluded from this process.

The distance values at the plurality of locations can be used 322 to analytically determine the visibility element axis 213 and spread 214 of the surface contained in the cell. The distance values at the plurality of locations can also be used 321 to derive the surface normals at a second plurality of locations. The surface normals at the second plurality of locations are then combined to determine the visibility element axis 213 and spread 214 of the surface contained in the cell. When step 320 finishes, every surface leaf cell of the ADF 120 is annotated with the visibility element 210, producing $ADF_{VE\_LEAF}$ 323.

In a bottom up fashion, step 325 determines visibility elements 210 for each non-leaf surface cell by combining the visibility elements 210 of the cell's children 323 until the root cell is reached and thus all surface cells have an associated visibility element 210. The resulting visibility elements 210 reflect the adaptive detail directed nature of the ADF 120. That is, the resulting visibility elements 210 are detail directed.

The ADF 120 is then annotated 325 with the determined visibility elements 210 to produce the $ADF_{VE}$ 140.

The process 300 can also be used for generating detail directed visibility elements 210 for any arbitrary input model 105. First, an ADF 120 is generated 115 from the input model 105 using generation parameters 110. Second, the $ADF_{VE}$ 140 is produced as described above.

Step 330 then associates rendering elements, e.g., triangles, with the cells of the $ADF_{VE}$ 140 that contain the rendering elements, producing $ADF_{VE\_ELEMS}$ 331. Step 340 generates a visibility element spatial data structure input model$_{VE}$ 341 that comprises the visibility elements 210 and their associated rendering elements. The input model$_{VE}$ 341 can be used to perform visibility testing without requiring access to the ADF 120 and the $ADF_{VE}$ 140.

Dynamic Modification of Active Cells

Figure 4:
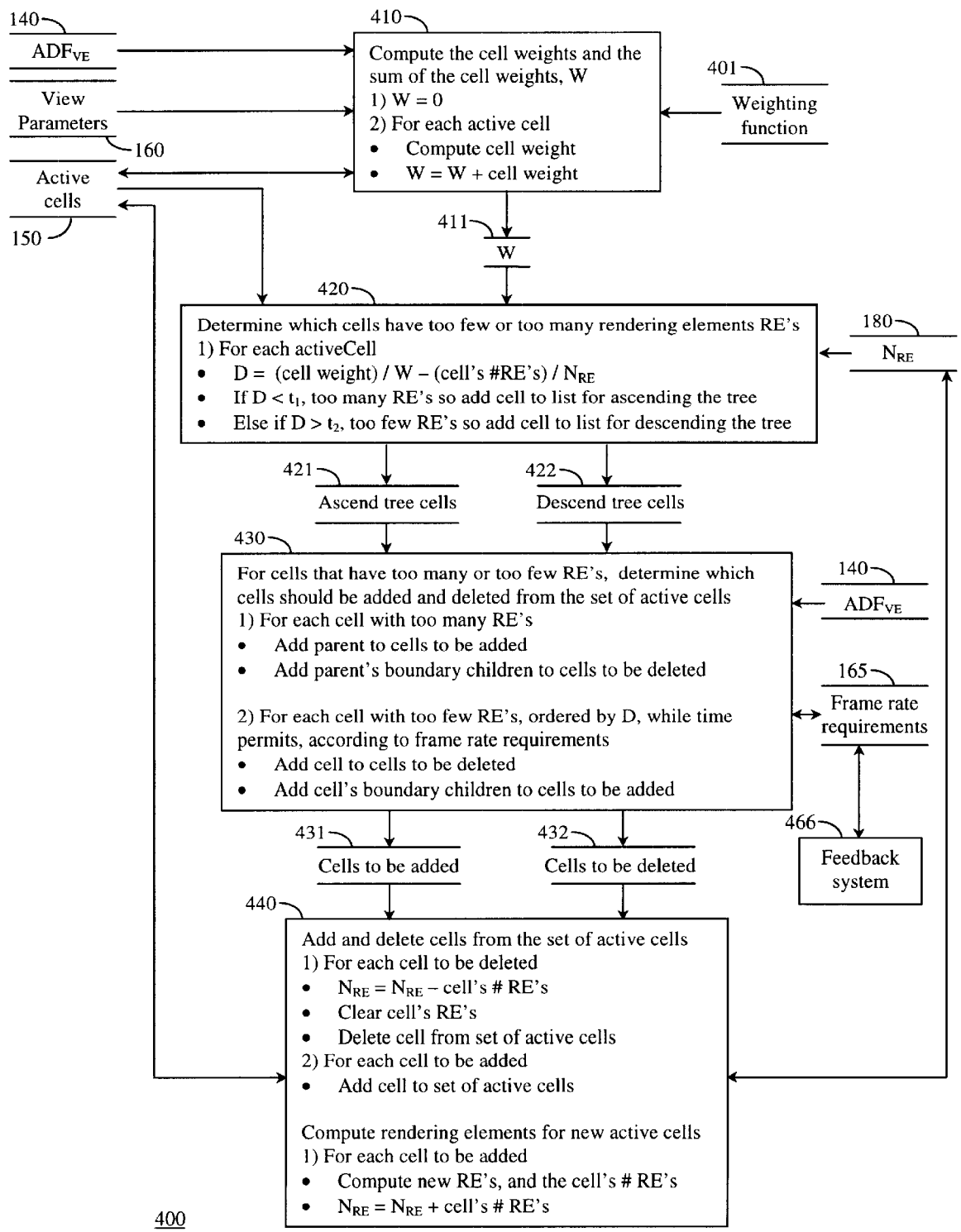
FIG. 4 is a flow diagram of a process for maintaining active cells of an adaptively sampled distance field representing a model.

FIG. 4 shows the process 400 for dynamically modifying active cells. Input to the process includes the viewing parameters 160, the active cells 150, the frame rate requirements 165, the $ADF_{VE}$ 140, the $N_{RE}$ 180, and a weighting function 401.

Step 410 assigns a cell weight, e.g., $0 \leq$ cell weight $\leq 1$, to each active cell, and determines a total weight W 411, initially zero. A cell is assigned a high weight, e.g., one, if the cell is on the object's silhouette, and zero weight if the cell is back-facing or outside the view frustum. Cells that are oblique to the view direction can be assigned intermediate weights, e.g., 0.5.

During weighting, other parameters, such as the projected screen size of the cell and specular highlighting, an exemplary shading parameter, can be considered. In addition, our method can use the cell's error measure as an indicator of surface roughness or curvature. The error measure can be factored into the weight.

Step 420 determines whether a cell has too few or too many rendering elements (RE's). This determination uses the following formulation:

$$D = (\text{cell weight})/W - (\text{cell's number of } RE\text{'s})/N_{RE}.$$

If $D < t_1$, then the cell has too many rendering elements, where $t_1$ is a first threshold. In this case, the cell is added to a first list 421 for ascending the $ADF_{VE}$ 140. If $D > t_2$, then the cell has too few rendering elements, and the cell is added to a second list 422 for descending the $ADF_{VE}$ 140.

In step 430, a determination is made to add or deleted cells depending on the lists 421–422. For each cell that has too many rendering elements, its parent cell is added to a first queue 431 used to add active cells, and the parent cell's boundary children cells are added to a second queue 432 used to delete active cells.

For each cell with too few rendering elements, the cell's boundary children cells are added to the first queue 431, and the cell is added to second queue 432.

Queues for Adding and Deleting Active Cells

To ensure that the frame rate requirements 165 are met, add operations are stored in the add queue 431, and delete operations are stored in the delete queue 432. The delete operations are processed after every adaptation to keep the number of rendering elements at a minimum. The add operations in the add queue 431 can be ordered according to the ratio D defined above. Add operations can be processed when frame time is available using a feedback system 166. It is also possible to geomorph, i.e., interpolate, between new rendering elements and existing rendering elements to avoid jerky motion and "popping" artifacts.

Step 440 adds and deletes active cells 150, and updates the total number of rendering elements $N_{RE}$ 180 accordingly. For each new active cell, its rendering elements are determined 440 and the number of new rendering elements is added to the total number of rendering elements $N_{RE}$ 180. By appropriately setting the thresholds $t_1$ and $t_2$, the number of rendering elements $N_{RE}$ 180 to be processed by a particular rendering engine 175 can be adjusted to meet frame rate and quality requirements.

As shown in FIGS. 5a and 5b, the method and system according to our invention produces detail-directed rendering elements, such as triangle meshes, that have a high visual quality. Note the silhouette quality of the bunny model in FIG. 5a. In addition, the invention minimizes the number of rendering elements in non-visible portions of the model. Note how areas outside the view frustum 510 are culled in FIG. 5b. Real-time frame rates, e.g., 30 frames per second or higher, can be sustained even as changes in the point of view cause significant differences in the visible portion of the model.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for dynamically generating rendering elements for a graphics model, comprising:
    converting the graphics model to an adaptively sampled distance field including surface cells representing a surface of the graphics model, comprising:
        determining a visibility element for each surface cell;
        determining a set of active cells, each active cell associated with one of the surface cells of the adaptively sample distance field, and each active cell having a corresponding visibility element; and
        determining rendering elements for each active cell, the visibility elements of each cell indicating a potential visibility of the associated rendering elements of the cell.

2. The method of claim 1 wherein the surface cells include a root surface cell, intermediate surface cells, and leaf surface cells, each surface cell storing distance values, and further comprising:

determining distance values of each leaf surface cell at a plurality of locations;

determining an axis and a spread of the visibility element for each leaf surface cell from the plurality of distance values by analytic means; and determining the visibility elements for the intermediate and root surface cells from the visibility elements of the leaf surface cells.

3. The method of claim 1 wherein the surface cells include a root surface cell, intermediate surface cells, and leaf surface cells, each surface cell storing distance values, and further comprising:

determining distance values of each leaf surface cell at a first plurality of locations;

deriving surface normals at a second plurality of locations from the distance values at the first plurality of locations;

combining the surface normals of each leaf surface cell to determine an axis and a spread of the visibility element for each leaf surface cell; and determining the visibility elements for the intermediate and root surface cells from the visibility elements of the leaf surface cells.

4. The method of claim 1 further comprising:

determining a total number of rendering elements of the set of active cells.

5. The method of claim 4 further comprising:

determining a weight for each active cell according to a weighting function;

deriving a value for each active cell from the weight of the cell and the total number of rendering elements of the set of active cells;

deleting a particular active cell if the value of the particular cell is less than a first threshold, further comprising:

adding the parent of the particular active cell to the set of active cells if the value of the particular cell is less than the first threshold;

deleting the surface children cells of the parent of the particular active cell from the set of active cells if the value of the particular cell is less than the first threshold; and adding additional active cells if the value of the particular active cell is greater than a second threshold, further comprising:

adding the surface children cells of the particular active cell to the set of active cells if the value of the particular active cell is greater than the second threshold;

deleting the particular active cell from the set of active cells if the value of the particular active cell is greater than a second threshold.

6. The method of claim 5 wherein the weight depends on viewing parameters.

7. The method of claim 5 wherein the weight depends on shading parameters.

8. The method of claim 5 wherein the weight depends on the projected screen size of the active cell.

9. The method of claim 5 wherein the first threshold and second threshold are modified to satisfy frame rate and quality requirements.

10. The method of claim 5 further comprising:

generating rendering elements for each cell added to the set of active cells;

deleting rendering elements for each cell deleted from the set of active cells; and updating the total number of rendering elements of the set of active cells according to a number of rendering elements generated for each cell added to the set of active cells and a number of rendering elements deleted for each cell deleted from the set of active cells.

11. The method of claim 10 wherein the generating is ordered by the value.

12. The method of claim 5 wherein the weighting function assigns a high weight to an active cell if the active cell is on the model's silhouette.

13. The method of claim 5 wherein the weighting function assigns a low weight to an active cell if the active cell is back-facing.

14. The method of claim 5 wherein the weighting function assigns a low weight to an active cell if the active cell is outside the view frustum.

15. The method of claim 1 wherein the rendering elements are determined at thirty frames per second.

* * * * *